Figure 4:
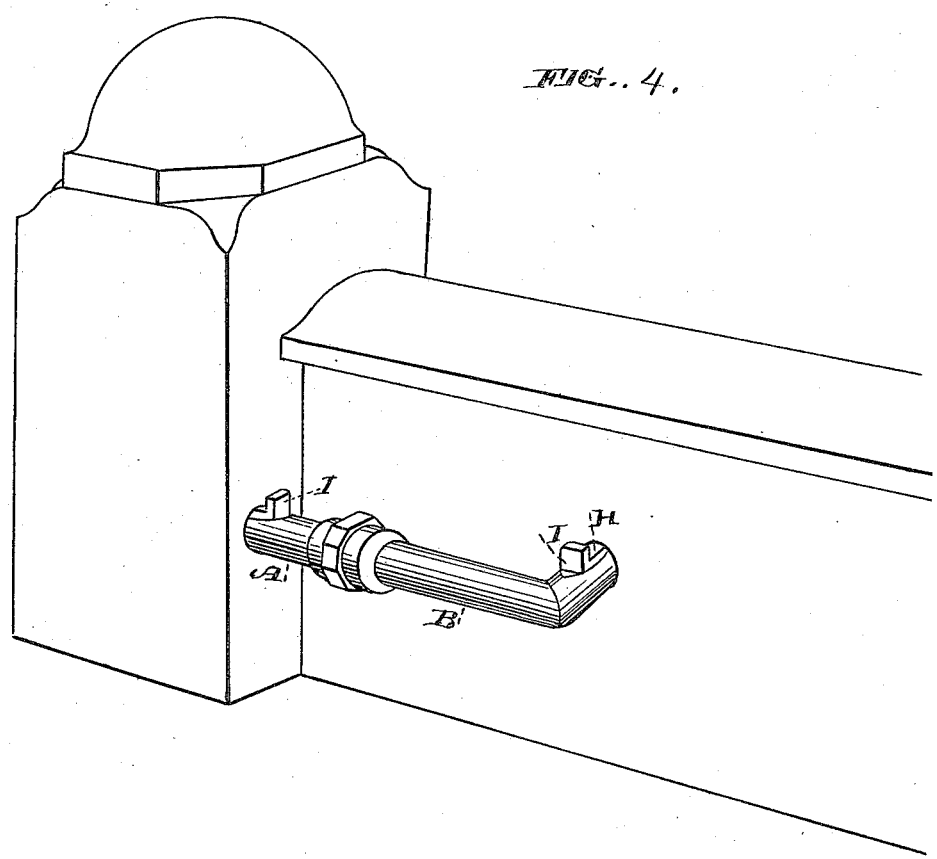

(No Model.) 2 Sheets—Sheet 1.
J. O'CONNOR.
CLAMP FOR STONE WORK.
No. 285,918. Patented Oct. 2, 1883.
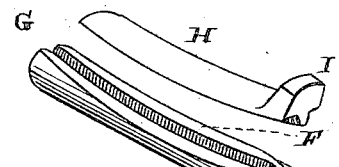
FIG. 1
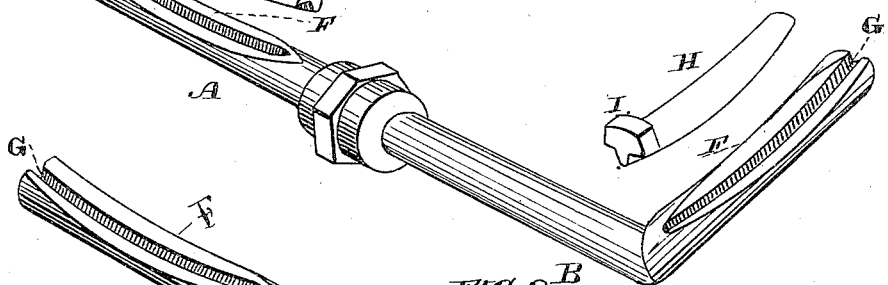
FIG. 2
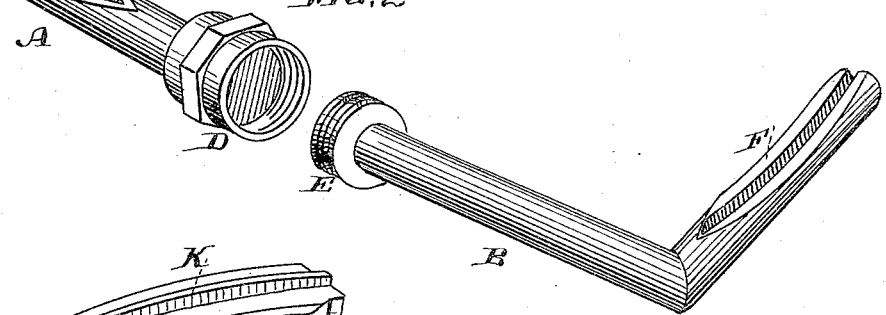
FIG. 3
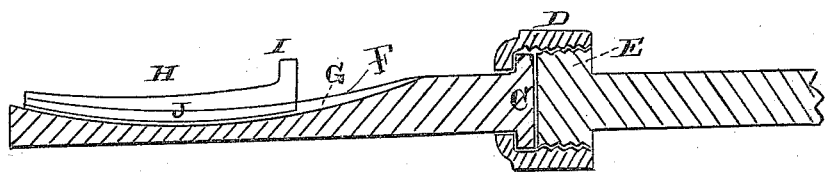
Witnesses,
Geo. H. Strong.
J. H. Krouse
Inventor,
Jere O'Connor
Dewey & Co.
Attorneys (No Model.) 2 Sheets—Sheet 2.

J. O'CONNOR.
CLAMP FOR STONE WORK

No. 285,918. Patented Oct. 2, 1883.

Witnesses:
Geo. H. Strong.
J. H. Strouse

Inventor,
Jere O'Connor
Dewey & Co.
Attorneys

UNITED STATES PATENT OFFICE.

JEREMIAH O'CONNOR, OF PIEDMONT, CALIFORNIA.

CLAMP FOR STONE-WORK.

SPECIFICATION forming part of Letters Patent No. 285,918, dated October 2, 1883.

Application filed April 17, 1883. (No model.)

*To all whom it may concern:*

Be it known that I, JEREMIAH O'CONNOR, of Piedmont, county of Alameda, State of California, have invented an Improved Clamp for Stone-Work; and I hereby declare the following to be a full, clear, and exact description thereof.

My invention relates to a means for clamping stone-work together, so as to form a solid permanent bond or union between the separate stones, forming a structure.

It consists of metal bars formed to enter holes made in the stones to be united, and keys by which they are secured therein, and a union or screw coupling by which the two are drawn and held together, as will be more fully explained by reference to the accompanying drawings, in which—

Figure 1 is a view of the bars united, and showing the keyways. Fig. 3 is a view of the bars with the keys in place. Fig. 2 shows the bars, keys, and coupling-nut separated. Fig. 4 shows the manner of uniting two parts of a structure.

A B are two bars of metal, of suitable size and shape for the work to be done. These bars may be straight in some cases, or one or both may be bent at right angles. The ends which are to be united are enlarged, one having a flange, C, upon it, over which the part D of the coupling-nut fits, so as to draw against this flange. The other bar has a screw-thread, E, formed upon its enlargement, and the interior of the nut D is threaded, so that by turning it may be advanced upon the threaded portion, and thus draw the two together. The opposite ends of the bars A B have a concave flattened space, F, formed upon them, with a deep groove, G, made longitudinally in them. The keys H have each a head, I, at one end, and that part which lies in contact with the concave flattened portion F is made convex, as at J, so as to correspond with F, and it has a projecting tongue, K, to enter the slot or groove G.

When two stones are to be united, the grooved ends of the bars A B are first placed in holes in the stones previously prepared, and the keys being in their places they are driven in, so as to bind against the inside of the hole, and at the same time the wedge-shaped tongues K, entering the grooves G, tend to spread the ends of the bars, so as to secure them firmly in place. These connections are made upon the inner sides of the work, so as to be concealed from view. The meeting ends of the bars having, by calculation in making the holes, been brought nearly together, are united and drawn together by turning the nut D, as before described. The tongues and grooves upon the keys and bars prevent the latter from turning around when the nuts are screwed up. Where two ends of coping-stones or other similar work are to be united, it will be seen that the bars must both be bent at right angles, so that the key-ends of each may enter the holes in the stones at right angles with the portions which are to be united by the nut; but if one part projects beyond the other, as in the case of a corner-post, one bar only need be bent, as shown. When the two parts have thus been drawn together, they form a union which it is impossible to separate by any ordinary means.

Having thus described my invention, what I claim as new, and desire to secure by Letters Patent, is—

1. The means for uniting stone-work, consisting of the bars A B, having a union or screw coupling at their meeting ends, while their opposite ends are secured in the parts to be united, substantially as herein described.

2. The bars A B, having the flattened concaved part F, and slot or groove G, in combination with the key H, made convex upon one side to fit the surface F, and provided with the tongue K, substantially as herein described.

3. The bars A B, flattened, concaved, and grooved at one end, and the corresponding tongued keys, H, to secure them into the stones, in combination with the enlarged meeting ends and the screw cap or nut, substantially as herein described.

In witness whereof I hereunto set my hand.

JEREMIAH O'CONNOR.

Witnesses:
S. H. NOURSE,
G. W. EMERSON.